3,189,668
METHOD OF SLIP CASTING BASIC REFRACTORY MATERIALS
Eldon D. Miller, Jr., Bridgeville, Pa., assignor to Harbison-Walker Refractories Company, Pittsburgh, Pa., a corporation of Pennsylvania
No Drawing. Filed Oct. 24, 1963, Ser. No. 318,492
7 Claims. (Cl. 264—56)

This invention relates to manufacture of ceramically bonded, chemically basic, refractory. In a particular aspect, it relates to the casting of refractory shapes from basic refractory material, and the subsequent firing of the cast shapes. In a more specific aspect, the invention relates to casting of complex, chemically basic refractory shapes. By "complex," I mean to describe shapes other than brick or blocks and, rather, such as for example, nozzles usable in the continuous casting of molten metals.

Use of casting techniques and, particularly, slip casting, for making thick-walled refractory shapes from certain chemically basic refractory materials has been fraught with difficulty, particularly when one has attempted to ceramically bond or fire the cast shapes.

As is known and well understood by those skilled in this art, in order to fabricate a shape by power pressing or by casting, etc., the refractory grain must be size graded, i.e. a batch is prepared of various quantities of different sized material in order to obtain densest packing consistent with the manufacturing process being used, so one may obtain high density and low porosity, which are usually considered desirable in most refractory shapes. For example, 50% of a given refractory batch may be −4+28 mesh, and the other 50% −28 mesh. Some of the −28 mesh fraction will rest on a 65 mesh screen and subsequent screens, with some passing a 325 mesh screen. When we speak of subsequent screens, as will be understood by those in the art, we are describing a stacked series of screens with progressively smaller openings; such as, for example, the United States Standard series or the Tyler series as are specified by ASTM Designation C92–46.

Thus, if one wishes to slip cast a chemically basic refractory material such as dead burned magnesite (more aptly termed dead burned magnesia in that its main constituent is MgO), it is necessary to have a considerable portion thereof in the −28 or −65 mesh fraction of the batch; or else one will be unable to obtain a self-sustaining refractory shape or, at least, will be unable to obtain high density and low porosity. Fine magnesia (−65 or −325 mesh), however, is even more susceptible to hydration than coarser particles, even when it is dead burned. The susceptibility of such basic refractories as magnesia to hydration upon exposure to the atmosphere has a tendency to cause cracking, bloating and swelling when used with an aqueous tempering media which is, of course, the preferred tempering media for slip casting. This tendency to hydrate is particularly distressing, with high purity dead burned synthetic magnesia which is available today. When I say "high purity" in this case, I mean a dead burned magnesia containing about 90% or more MgO, by weight on the basis of an oxide analysis and, preferably, over 96% MgO. The remaining portion of such magnesites is normally $Al_2O_3$, $Fe_2O_3$, CaO, trace impurities such as boron, and loss on ignition. Hydration is also encountered with less pure magnesites, particularly if they contain free lime or other readily hydratable compounds of calcium.

Accordingly, it is an object of this invention to provide a novel process of casting refractory shapes from chemically basic refractory grain, the major portion of which is MgO, by weight, on an oxide basis. It is another object of the invention to provide a method for slip casting thick-walled refractory shapes from chemically basic refractory materials, such as high purity magnesia, which shapes are capable of subsequent drying and burning to provide ceramic bonding throughout the shape without bloating, swelling or cracking. By thick walled, I mean greater than about ¼″ in thickness.

Briefly, according to one aspect of the invention, chemically basic refractory grain is size graded, slip cast, dried and fired to obtain a ceramically bonded high purity magnesite shape. The sizing is substantially as follows: 50 to 65% −4+28 mesh, the remainder passing a 28 mesh screen. About 30 to 35% of the grain is −65 mesh, and the average particle diameter of the −65 mesh fraction is, preferably, on the order of 2 to 3 microns. From about 0.2 to 5% and, preferably, 0.2 to 2%, by weight, of finely divided flowers of sulfur, based on the weight of the dry size graded magnesite, is intimately admixed with said magnesite. The time of completion of mixing is visually determined by an operator, but experience has shown me 5 to 10 minutes is adequate in such as a muller-type mixer.

A tempering fluid is prepared. A preferred tempering fluid is comprised of 5 to 7% of water, about 0.5% of a dispersant and about 0.1% of a surfactant. Suitable dispersants are sodium pryophosphate, Darvan #7, etc. A suitable surfactant is the product of commerce, Antifoam A. The surfactant is not essential, but it is preferred in the best mode now known to me for the practice of the invention, since it lowers the water requirement by about 1 percent, based on the dry weight of the batch. For example, without the Antifoam A, 6 to 7 parts may be needed, whereas, with the surfactant, 5 to 6 parts can be used; and as is, of course, realized, the lower the water content the higher the density and the easier it is subsequently to dry a cast shape.

The tempering fluid is mixed with the dry ingredients (the size graded magnesite and the sulfur) for about 5 to 10 minutes, and then poured into a prepared plastic mold. I prefer plaster, but other types of water-absorbent materials can be used; for example, paper or cardboard. It is essential, however, that the material be water-absorbent, in order to prevent surface entrapment of gas bubbles about the cast shape. Such bubbles are undesirable, because they result in surface imperfections in the subsequent fired shape. The mold usually is subjected to vibration during pouring of the tempered mixture. Without vibration, I find it very difficult to cause the mixture to completely fill a porous mold.

The material is left in the mold to set. Set time is variable, but is easily determined by an operator. In my own work, when an exposed surface of the cast material resists light pressing of my finger without deformation, then I consider the shape to be set and proceed to strip the mold therefrom. The resulting shape should then be dried. It may be air-dried or placed in a drier, which is heated to a temperature between 200 and 250° F. The drying is generally continued until the shape has constant weight. By constant weight, I means no further volatiles can be driven off at the low drying temperatures I suggest.

The dried shapes are placed in a kiln and fired to a temperature between 2500 and 3000° F., preferably between 2700 and 2900° F. for the high purity magnesites I have mentioned above.

The following examples are given by way of explanation and not by way of limitation, in order to more fully describe the invention to those skilled in the art.

EXAMPLE I

A dead burned magnesite, having the following chemical analysis, was size graded so that 60% was −4+28 mesh and 40% was −28 mesh. About 30% of the magnesite passed a 65 mesh screen, and had an average particle diameter, as determined by the air permeability method, on the order of 2.5 microns.

*Table I.—Approximate dead burned magnesite analysis*

| | Percent |
|---|---|
| Silica ($SiO_2$) | 1.0 |
| Alumina ($Al_2O_3$) | 0.2 |
| Iron oxide ($Fe_2O_3$) | 0.2 |
| Lime (CaO) | 1.0 |
| Magnesia (MgO) | 97.5 |
| Loss on ignition | 0.1 |
| | 100.0 |

About 0.2% of finely divided flowers of sulfur was intimately admixed with the sized magnesite. The sulfur particle size is sub micron. It was Technical Grade and can be purchased as an article of commerce.

I separately prepared a tempering fluid. It was comprised of 5 parts of water based on the weight of the dry solids, 0.5 parts of Darvan #7, also based on the weight of the dry solids, plus 3 cc. of a 1% solution of a 50% emulsion of Antifoam A for each 10 pounds of dry refractory batch. Since this batch I am now describing weighed 100 pounds, 30 cc. of the emulsion was used. The tempering fluid ingredients were intimately admixed with the dry solids consisting of the sized magnesite and sulfur. A plaster mold was prepared and the liquid and solids mixture poured into the mold until it was filled. After approximately 30 minutes, the cast material had solidified to such an extent that light finger pressure left no impression on an exposed area of the cast article. The mold was stripped, and the shape placed in a drier which was heated to 250° F. to dry overnight (about 12 hours). The dried shape was placed in a kiln and fired to 2820° F. for 10 hours.

After firing, the shape was removed from the kiln. It was a strong article of good shape, and careful visual examination could discern no cracking.

EXAMPLE II

The procedure outlined in Example I, in which a dead burned magnesite having the following chemical analysis is utilized:

*Table II*

| | Percent |
|---|---|
| Silica ($SiO_2$) | 5.0 |
| Lime (CaO) | 14.0 |
| Alumina ($Al_2O_3$) | 2.0 |
| Iron oxide ($Fe_2O_3$) | 6.0 |
| Magnesia (MgO) | 73.0 |
| | 100.0 |

EXAMPLE III

A dead burned magnesite having the following analysis is used according to the procedure outlined in Example I:

*Table III*

| | Percent |
|---|---|
| Silica ($SiO_2$) | 2.8 |
| Alumina ($Al_2O_3$) | 0.3 |
| Iron oxide ($Fe_2O_3$) | 0.6 |
| Lime (CaO) | 1.5 |
| Magnesia (MgO) | 94.8 |

EXAMPLE IV

A magnesite having the following analysis is used, according to the procedure outlined in Example I:

*Table IV*

| | Percent |
|---|---|
| Silica ($SiO_2$) | 3.8 |
| Alumina ($Al_2O_3$) | 2.1 |
| Iron oxide ($Fe_2O_3$) | 3.9 |
| Lime (CaO) | 3.0 |
| Magnesia (MgO) | 84.8 |

Example I is the preferred embodiment of this invention. It should be understood, however, that very satisfactory results are obtained without the use of the Darvan #7, or the silicone emulsion. For example, about 1 part, by weight, of the sodium pyrophosphate can be used as the dispersant, but in this case 6 to 7 parts, by weight, of water should be used, and no silicone emulsion.

I believe one of the more important process parameters of my invention to be the sizing and amount of —65 mesh, basic refractory material, which is present in the mix. I have stated that about 30 to 35%, by weight, of the total batch, is the workable range for —65 mesh material, and the average particle diameter, as determined by the air permeability method, should be maintained between 2 and 3 microns, for best results. If the —65 mesh material is too much coarser, the slip is "sandy" in texture. By "sandy," I mean it feels like a concrete mixture. Such a mixture cannot be adequately dispersed. When the particle size average diameter is less than about 2 to 3 microns, the mixture tends to gel at room temperature (nominally 70 to 75° F.), and it does not seem possible to cast the material properly. When more than 35% of the total mixture is —65 mesh, even though it is of my preferred 2 to 3 micron average particle diameter, there is again the undesirable gel at room temperature. When less than 30% of the mixture is of my preferred —65 mesh type material, even though properly sized, there is again the undesirable sandy texture and inability to adequately disperse the fines throughout the tempered mix to obtain a uniformly textured cast shape.

Another important process parameter is the sulfur addition. I prefer to use between 0.2 to 2%, by weight, based on the total weight of dry solids. Lacking this sulfur addition, I have not been able to obtain a dried shape which is free from cracks, and my experience has shown me I must obtain a dried green cast shape free of cracks in order to obtain a shape which can be fired without extensive loss of ware due to cracking.

As far as I know, it has not previously been possible to cast, using an aqueous tempering media, and then fire a refractory shape having a cross section thicker than about ⅛″ made entirely of high purity magnesite. Further, while it may be that some cast fired shapes have been made from less pure magnesites, using the method of this invention, superior shapes are obtained.

Also, it should be understood that various other refractory aggregates may be used in the coarser fraction, i.e. the +65 mesh fraction, of the dry mix which is used to make shapes according to the invention. For example, up to 15 or 20%, by weight, of chrome ore, dead burned dolomite, forsterite, alumina, olivine, silicon carbide, hard burned fire clay, ganister, fused silica, etc., can be used in the +65 mesh fraction. Up to 5%, or so, can be in the —65 mesh fraction, also, if desired.

Further, if desired, a batch composition of 60% +65 mesh chrome ore and 40% —65 mesh dead burned magnesite can be cast into shapes using this invention. Of course, the magnesite should be sized in the manner discussed above.

Having thus described the invention in detail and with sufficient particularity as to enable those skilled in the art to practice it, what is desired to have protected by Letters Patent is set forth in the following claims:

I claim:

1. That method of slip casting basic refractory shapes from basic refractory materials comprising the steps of:
   (1) preparing a size graded refractory batch at least 80% of which is high purity dead burned magnesite, said batch having the following sizing: 50 to 65% —4+28 mesh, 35 to 50% —28 mesh, 30 to 35% of the —28 mesh material being —65 mesh, and the average particle diameter of the —65 mesh material being on the order of about 2 to 3 microns, all percentages being by weight;

(2) adding from 0.2 to 5%, by weight of the refractory batch, of finely divided flowers of sulfur to the size graded basic refractory;
(3) preparing from 5 to 7 parts, by weight, of aqueous tempering fluid;
(4) intimately admixing the tempering fluid with the refractory and sulfur;
(5) casting the tempered refractory mixture in a fluid absorbent mold while subjecting said mold to vibration to a degree sufficient to cause flowing of tempered refractory to fill the mold;
(6) allowing the cast material to set;
(7) separating the mold from the set shape;
(8) drying the cast shape to substantially constant weight; and
(9) firing the shape at a temperature in the range 2500 to 3000° F.

2. That method of slip casting basic refractory shapes from refractory materials comprising the steps of:
(1) preparing a size graded refractory batch at least 80% of which is high purity dead burned magnesite, said batch having the following sizing: 50 to 65% −4+28 mesh, 35 to 50% −28 mesh, 30 to 35% of the −28 mesh material being −65 mesh, and the average particle diameter of the −65 mesh material being on the order of about 2 to 3 microns, all percentages being by weight;
(2) adding from 0.2 to 5%, by weight of the refractory batch, of finely divided flowers of sulfur to the size graded basic refractory;
(3) preparing from 5 to 7 parts, by weight, of aqueous tempering fluid;
(4) intimately admixing the tempering fluid with the refractory and sulfur;
(5) casting the tempered refractory mixture in a fluid absorbent mold and causing the tempered refractory to fill the mold;
(6) allowing the cast material to set;
(7) separating the mold from the set shape; and
(8) drying the cast shape to substantially constant weight.

3. The method of claim 2 in which the refractory material is substantially all dead burned magnesite of at least about 90% MgO, by weight, on an oxide basis.

4. The method of claim 2 in which the tempering fluid consists of:
(a) about 5 to 6 parts of water,
(b) about 0.5 part of a dispersant for the −65 mesh magnesite.

5. The method of claim 2 in which the sulfur amounts to 0.2 to 2%, by weight of the refractory batch.

6. The method of slip casting basic refractory shapes from basic refractory materials comprising the steps of:
(1) preparing a sized graded refractory batch of 60% chrome ore and 40% high purity dead burned magnesite, said batch having the following sizing: 50 to 65% a −4+28 mesh fraction, 35 to 50% a −28 mesh fraction, 30 to 35% of the −28 mesh material being −65 mesh fraction, the average particle diameter of the −65 mesh material being on the order of about 2 to 3 microns, all percentages being by weight, and said magnesite constituting substantially all of the −65 mesh fraction;
(2) adding from 0.2 to 5%, by weight of the refractory batch, of finely divided flowers of sulfur to the size graded basic refractory;
(3) preparing from 5 to 7 parts, by weight, of aqueous tempering fluid;
(4) intimately admixing the tempering fluid with the refractory and sulfur;
(5) casting the tempered refractory mixture in a fluid absorbent mold while subjecting said mold to vibration to a degree sufficient to cause flowing of tempered refractory to fill the mold;
(6) allowing the cast material to set;
(7) separating the mold from the set shape;
(8) drying the cast shape to substantially constant weight; and
(9) firing the shape at a temperature in the range 2500 to 3000° F.

7. In a method of slip casting chemically basic refractory shapes from a batch of dead burned magnesite refractory and an aqueous tempering fluid, the improvement which comprises adding about 0.2 to 5%, by weight based on the total refractory batch, of finely divided sulphur to the batch.

References Cited by the Examiner
UNITED STATES PATENTS

| | | | |
|---|---|---|---|
| 2,636,244 | 4/53 | Williams | 264—86 |
| 2,947,649 | 8/60 | Davies | 106—58 |
| 3,133,134 | 5/64 | Garrett | 264—86 |

ROBERT F. WHITE, *Primary Examiner.*

ALEXANDER H. BRODMERKEL, *Examiner.*